US009664782B2

(12) United States Patent
Yoda (10) Patent No.: US 9,664,782 B2
(45) Date of Patent: May 30, 2017

(54) OBJECT INFORMATION ACQUIRING APPARATUS (75) Inventor: Haruo Yoda, Nishitama-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 549 days.

(21) Appl. No.: 14/114,308

(22) PCT Filed: Apr. 26, 2012

(86) PCT No.: PCT/JP2012/002877
§ 371 (c)(1),
(2), (4) Date: Oct. 28, 2013

(87) PCT Pub. No.: WO2012/153481
PCT Pub. Date: Nov. 15, 2012

(65) Prior Publication Data
US 2014/0043941 A1 Feb. 13, 2014

(30) Foreign Application Priority Data

May 10, 2011 (JP) ................................. 2011-105319

(51) Int. Cl.
*G01S 7/52* (2006.01)

(52) U.S. Cl.
CPC ...... *G01S 7/52017* (2013.01); *G01S 7/52047* (2013.01)

(58) Field of Classification Search
CPC .......................... G01S 7/52017; G01S 7/52047
(Continued)

(56) References Cited

U.S. PATENT DOCUMENTS

| 5,128,963 A | * | 7/1992 | Akagiri ................ H04B 14/046 375/240.12 |
| 2011/0128816 A1 | | 6/2011 | Baba et al. ..................... 367/11 |

(Continued)

FOREIGN PATENT DOCUMENTS

| JP | H01 (1989)-269315 | 10/1989 |
| JP | 2005-160977 | 6/2005 |

(Continued)

OTHER PUBLICATIONS

J.-F. Synnevåg et al., "Adaptive Beamforming Applied to Medical Ultrasound Imaging", *IEEE Trans. Ultrasonic Ferroelectrics and Frequency Control*, Vo. 54, No. 8 (Aug. 2007).

*Primary Examiner* — James Hulka
*Assistant Examiner* — John T Nolan
(74) *Attorney, Agent, or Firm* — Fitzpatrick, Cella, Harper & Scinto (57) ABSTRACT

The present invention employs an object information acquiring apparatus comprising a plurality of receiving elements which receive acoustic waves emitted from an object and convert the acoustic waves into received signals, a delay unit which matches phases of the received signals, a complex converter which converts the received signals into complex signals, a complex covariance matrix calculator which periodically obtains a complex covariance matrix by using a complex signal group configured from a plurality of phase-matched complex signals, an eliminator which eliminates the number of bits of input data configured from at least either the complex signal group or matrix elements, and an electric power calculator which calculates a power of target positions, wherein the eliminator eliminates the number of bits by performing common level conversion processing on all input data relating to one complex covariance matrix.

19 Claims, 7 Drawing Sheets

(58) Field of Classification Search
USPC .......................................................... 367/87
See application file for complete search history.

(56) References Cited

U.S. PATENT DOCUMENTS

| | | | |
|---|---|---|---|
| 2011/0307181 A1* | 12/2011 | Nagae | G01S 7/52047 702/19 |
| 2012/0022373 A1 | 1/2012 | Tateyama | 600/437 |
| 2012/0044785 A1 | 2/2012 | Yoda et al. | 367/92 |
| 2012/0281902 A1 | 11/2012 | Oikawa et al. | 382/131 |
| 2012/0314534 A1 | 12/2012 | Yoda et al. | 367/7 |
| 2013/0308850 A1 | 11/2013 | Oikawa et al. | 382/131 |
| 2014/0051970 A1 | 2/2014 | Ebisawa et al. | 600/407 |
| 2014/0058262 A1 | 2/2014 | Yoda | 600/443 |

FOREIGN PATENT DOCUMENTS

| | | |
|---|---|---|
| JP | 2011-005237 | 1/2011 |
| WO | WO 2010/100868 | 9/2010 |

\* cited by examiner

OBJECT INFORMATION ACQUIRING APPARATUS

TECHNICAL FIELD

The present invention relates to an object information acquiring apparatus which receives acoustic waves emitted from an object and creates an image of the internal structure of the object.

BACKGROUND ART

An ultrasound imaging apparatus which creates images of the three-dimensional internal structure of an object by using ultrasound waves is being widely utilized in medical practice as an ultrasound diagnostic apparatus that is inexpensive and with minimal side effects.

The performance of ultrasound imaging apparatuses is dramatically improving year by year based on the improvement of ultrasound imaging technology. As one technology to further improve the performance, research is being conducted on image reconstruction technology using the CMP (Constrained Minimization of Power) method (refer to Non Patent Literature 1). The CMP method referred to herein is also referred to as the DCMP method (Directionally Constrained Minimization of Power), or the CAPON method.

The CMP method is signal processing technology that was developed as one type of adaptive antenna technology, and is one type of adaptive signal processing. The CMP method is a reception method of adaptively adjusting the directionality of reception based on a constrained condition of evening out the received gain of the radio waves arriving from the intended direction, and constantly causing the power of all received signals, including interfering waves, to be minimum. According to this method, since the ratio of the interfering wave power can be minimized relative to the signal power, signals with a favorable SN ratio can be received.

The specific calculation of the CMP method can be basically executed with the respective steps of (1) to (6) below.

(Step 1): The ultrasound received signals received by a plurality (n number) of receiving elements are subject to delay processing, and the phases are matched so that the n number of ultrasound received signals generated from the same target position are aligned to the same time.

(Step 2): The n number of phase-matched received signals are converted into complex signals. For the ensuing explanation, the n number of complex signals at time t are set as a receiving complex vector X[t] configured from an n number of elements.

(Step 3): A complex covariance matrix A[k] is calculated with a given time period T clock based on the receiving complex vector X[t]. The calculation formula is Formula (1) below.

[Math. 1]

$$A[k] = \sum_{t=kT}^{kT+T-1} X[t]X[t]^H \quad (1)$$

Here, symbol H as the superscript of X[t] represents the complex conjugate as the vector transpose.

(Step 4): An optimal weight vector W[k] is calculated using the matrix A[k] and a known constrained vector C. The calculation formula is Formula (2) below.

[Math. 2]

$$W[k] = \frac{A[k]^{-1}C}{C^H A[k]^{-1} C} \quad (2)$$

Here, −1 as the superscript of A[k] represents the inverse matrix of A[k]. Moreover, the constrained vector C is a known vector for designating the arriving direction of the signals, and is a vector which normally causes all elements to be 1 relative to the output signal of the delay processing.

(Step 5): The constrained minimization of power Pow[k] is calculated from the optimal weight vector W[k] and the receiving complex vector X[t] based on Formula (3) below.

[Math. 3]

$$Pow[k] = \frac{1}{2} \cdot \sum_{t=kT}^{kT+T-1} |X[t]^H W[k]|^2 \quad (3)$$

However, if Formula (3) is substituted with Formula (1) or Formula (2), it can be modified as Formula (4) below. Accordingly, the constrained minimization of power Pow can be directly calculated based on Formula (4) by omitting the calculation of the weight vector W[k].

[Math. 4]

$$\begin{aligned} Pow[k] &= \frac{1}{2} \cdot \sum_{t=kT}^{kT+T-1} |X[t]^H W[k]|^2 \\ &= \frac{1}{2} \cdot \sum_{t=kT}^{kT+T-1} (W[k]^H X[t]X[t]^H W[k]) \\ &= \frac{1}{2} \cdot W[k]^H A[k] W[k] \\ &= \frac{1}{2 \cdot C^H A[k]^{-1} C} \end{aligned} \quad (4)$$

(Step 6): The logarithm of the power Pow[k] is calculated, and the k-th pixel (target position) of the output line image is set as a gray value q. The calculation formula is Formula (5) below.

[Math. 5]

$$q = \text{Log}[Pow[k]] \quad (5)$$

The processing of this logarithm conversion is not necessarily required, but is normally performed to facilitate the visualization of the output image.

Note that, in the actual calculation, spatial average processing on the matrix A and the small positive number addition processing on the diagonal elements are concurrently performed in addition to the foregoing steps. Nevertheless, details regarding such processing are not directly related to the present invention, and the explanation thereof is omitted.

As a result of performing the foregoing calculations, it is possible to perform image reconstruction based on the CMP method. It is known that, by using the CMP method, it is possible to obtain images with improved resolution and contrast in comparison to images that are reconstructed based on standard delay-and-sum processing.

CITATION LIST

Non Patent Literature

[NPL 1]
J. F. Synnevag, et al. "Adaptive Beamforming Applied to Medical Ultrasound Imaging", IEEE Trans. ULTRASONIC, FERROELECTRICS, AND FREQUENCY CONTROL, VOL. 54, NO. 8, AUGUST 2007

SUMMARY OF INVENTION

Technical Problem

The performance of an ultrasound imaging apparatus is expected to improve considerably by applying the CMP method. Nevertheless, in order to apply the CMP method to an ultrasound imaging apparatus, required is a compact and inexpensive computer processing device capable of processing the foregoing complex calculations of the CMP method in real time, but such a device was not conventionally known and it was difficult to apply the CMP method.

With an ultrasound imaging apparatus, the noise signals that overlap with the echo signals emitted from the target position are echo signals arriving from various positions within the object, and the arrival direction and intensity thereof change drastically together with the lapse of time. Thus, if favorable echo images are to be obtained with the CMP method, it is necessary to perform the calculation steps of the CMP method shown in foregoing steps (1) to (6) for each pixel of the echo image and deal with the rapidly-varying noise signals.

In the fields of radar and communication to which the CMP method has been applied from the past, the direction and intensity of interfering waves do not drastically change as with ultrasound waves, and therefore the calculation of the optimal weight vector could be set to a relatively slow period. Nevertheless, with an ultrasound imaging apparatus, it is necessary to sequentially execute complex calculations, including inverse matrices, within an extremely short period for each pixel, and the development of an ultrafast, inexpensive and compact computational circuit was the biggest challenge upon applying the CMP method to an ultrasound imaging apparatus.

For example, considered is a case of calculating the constrained minimization of power by calculating the covariance matrix for every 10 clocks relative to the received signals that are input with a sampling clock of 50 MHz. In the foregoing case, since the ultrasound propagation rate of the human body as the object is roughly 1500 m/s, it is possible to configure an echo image having a pixel size of roughly 0.15 mm. If this echo image is to be reconstructed in real time, the calculations to be performed in the CMP method need to be completed in a time period of 200 ns or less. There is no known inexpensive compact computational circuit capable of performing this kind of ultrafast calculation.

The present invention was devised in view of the foregoing problems. Thus, an object of this invention is to provide a means for enabling a computational circuit for performing calculations of the CMP method at a high speed to be an inexpensive and compact circuit.

Solution to Problem

The present invention provides an object information acquiring apparatus, comprising:

a plurality of receiving elements which receive acoustic waves emitted from an object and convert the acoustic waves into received signals;

a delay unit which matches phases of the received signals;

a complex converter which converts the received signals output from the delay unit into complex signals;

a complex covariance matrix calculator which periodically obtains a complex covariance matrix by using a complex signal group configured from a plurality of phase-matched complex signals;

an eliminator which uses, as input data, at least either the complex signal group or matrix elements contained in the complex covariance matrix, and eliminates the number of bits of the input data; and an electric power calculator which calculates a power value of each target position based on the complex covariance matrix, wherein the eliminator eliminates the number of bits by performing common level conversion processing on all input data relating to one complex covariance matrix.

Advantageous Effects of Invention

According to the present invention, it is possible to provide a means for enabling a computational circuit for performing calculations of the CMP method at a high speed to be an inexpensive and compact circuit.

Further features of the present invention will become apparent from the following description of exemplary embodiments with reference to the attached drawings.

DESCRIPTION OF EMBODIMENTS

The embodiments for implementing the present invention are now explained with reference to the appended drawings.

The ultrasound imaging apparatus includes an apparatus which uses ultrasound echo technology of acquiring information by transmitting ultrasound waves to an object and receiving the reflected waves. In addition, the ultrasound imaging apparatus of the present invention includes an apparatus which receives acoustic waves emitted from within the object as a result of the object being irradiated with light (electromagnetic waves), and uses the photoacoustic effect of acquiring object information as image data. Accordingly, the ultrasound imaging apparatus of the present invention can also be referred to as an object information acquiring apparatus. When the object is a biological object, the object information acquiring apparatus can also be referred to as a biological information acquiring apparatus.

Here, acoustic waves are typically ultrasound waves, and include elastic waves referred to as sound waves, ultrasound waves, photoacoustic waves, and optical ultrasound waves.

With the former object information acquiring apparatus that uses the ultrasound echo technology, object information is information which reflects the differences in the acoustic impedance of the tissues inside the object. With the latter object information acquiring apparatus that uses the photoacoustic effect, object information shows the generation source distribution of the acoustic waves generated by optical irradiation, the initial sound pressure distribution in the object, the light energy absorption coefficient density distribution that is derived from the initial sound pressure distribution, the absorption coefficient distribution, or the concentration distribution of the substance configuring the tissues. The substance concentration distribution is, for example, oxygen saturation distribution or oxidized/reduced hemoglobin concentration distribution. The power distribution that is acquired in the present invention is the distribution corresponding to the foregoing object information, and this power distribution is acquired as the image data.

The cause of the increase in size of the computational circuit and the method of inhibiting such increase in size are now examined.

Adaptive signal processing such as with the CMP method requires complex calculations including inverse matrices. When realizing such complex calculations with an electronic circuit, a floating point-type operation circuit for minimizing the accumulation of truncation errors caused by the calculations. Nevertheless, a floating point-type operation circuit is large, and if a higher speed is to be achieved by mounting numerous operation circuits in parallel, the circuit size of the overall device will become extremely large, and it is difficult to realize an inexpensive device for use in practical application.

Meanwhile, when the apparatus is configured using a fixed point-type operation circuit, the received signals need to be data with a large number of bits in order to deal with the broad dynamic range of the ultrasound waves, and again it is not possible to avoid the enlargement of the circuit size. For example, if the received signals are 24 bits, the respective elements of the complex covariance matrix will be 48 bits or more. Nevertheless, to configure a constrained minimization of power computational circuit, which includes inverse matrices which use data of 48 bits or more as the input, using a fixed point-type computational circuit was difficult in terms of circuit size and calculation speed.

In the present invention, as explained in the following embodiments, a means for eliminating the number of bits of data by using level conversion processing is provided to at least either the former stage of the complex covariance calculation with particularly numerous algebraic calculations or the former stage of the constrained minimization of power calculation. It is thereby possible to realize a compact circuit capable of performing calculations of the CMP method at an ultrafast speed. The level conversion processing used in the present invention is the processing of bit-shifting signal data in a higher direction in covariance matrix units to the extent that the maximum value will not overflow and deleting the lower bits with respect to the signal data group relating to one covariance matrix. Here, with respect to the upper bit shift number, the input data (signals contained in the matrix elements of one covariance matrix or one complex signal group) is treated as the unit, and the bits are shifted by the number of bits common to that unit. Moreover, with respect to the lower bit deletion number, the bits are deleted by the number of bits common in all input data.

According to the above, since small signals are converted into large signals, the calculation accuracy is not impaired considerably even if the lower bits are deleted. Since it is thereby possible to eliminate the number of bits of signal data while minimizing the deterioration of the calculation accuracy, the overall computational circuit can be downsized.

In addition, provided is a means for transferring the bit shift amount per covariance matrix as an index to the latter stage, and correcting the calculated value of the constrained minimization of power based on the transferred index, and the difference in the calculated values of the constrained minimization of power based on the level conversion processing is thereby corrected.

The embodiment of the present invention explained below is unique in that a bit shift is performed on the signal data group related to one covariance matrix by the one common number of bits as described above. It is thereby possible to correct the calculated value of the constrained minimization of power that is calculated from one complex covariance matrix. Thus, the former stage of the complex covariance matrix calculation and the former stage of the complex covariance matrix calculation, which enable the facilitated separation of the signal data group related to one covariance matrix, can be placed at working positions that are suitable for the level conversion processing of the present invention.

Since the ultrasound signals of an ultrasound imaging apparatus have a broad dynamic range and a large signal bit number to begin with, there is no choice for the circuit size to be large. Nevertheless, if the signal bit number of the computational circuit can be eliminated based on the level conversion processing of the present invention, the calculations of the CMP method can be realized with a relatively compact and fast computational circuit mainly based on a fixed point-type computational circuit. In the fixed point-type computational circuit, the circuit size of an adder-subtractor circuit is basically proportional to the calculation bit number, and the size of the multiplying circuit is basically proportional to the square of the calculation bit number. Accordingly, for instance, if the respective matrix elements of the complex covariance matrix can be converted from 48 bits into 24 bits by the present invention, the overall circuit size can be reduced to roughly ⅓ to ¼ of the original size. If the calculation bit number can be eliminated, the calculation speed can also be increased accordingly.

If the circuit size can be reduced, there is a possibility that the overall computational circuit of the CMP method can be realized using one large-scale FPGA (Field Programmable Gate Array). Otherwise, it is also possible to mount a more high-performance complex covariance matrix computational circuit and a constrained minimization of power computational circuit on one large-scale FPGA. If the overall circuit can fit onto one large-scale FPGA, the drive frequency of the respective operation circuits can be set high to facilitate the further speed-up of calculation.

<Embodiment 1>

Figure 1:
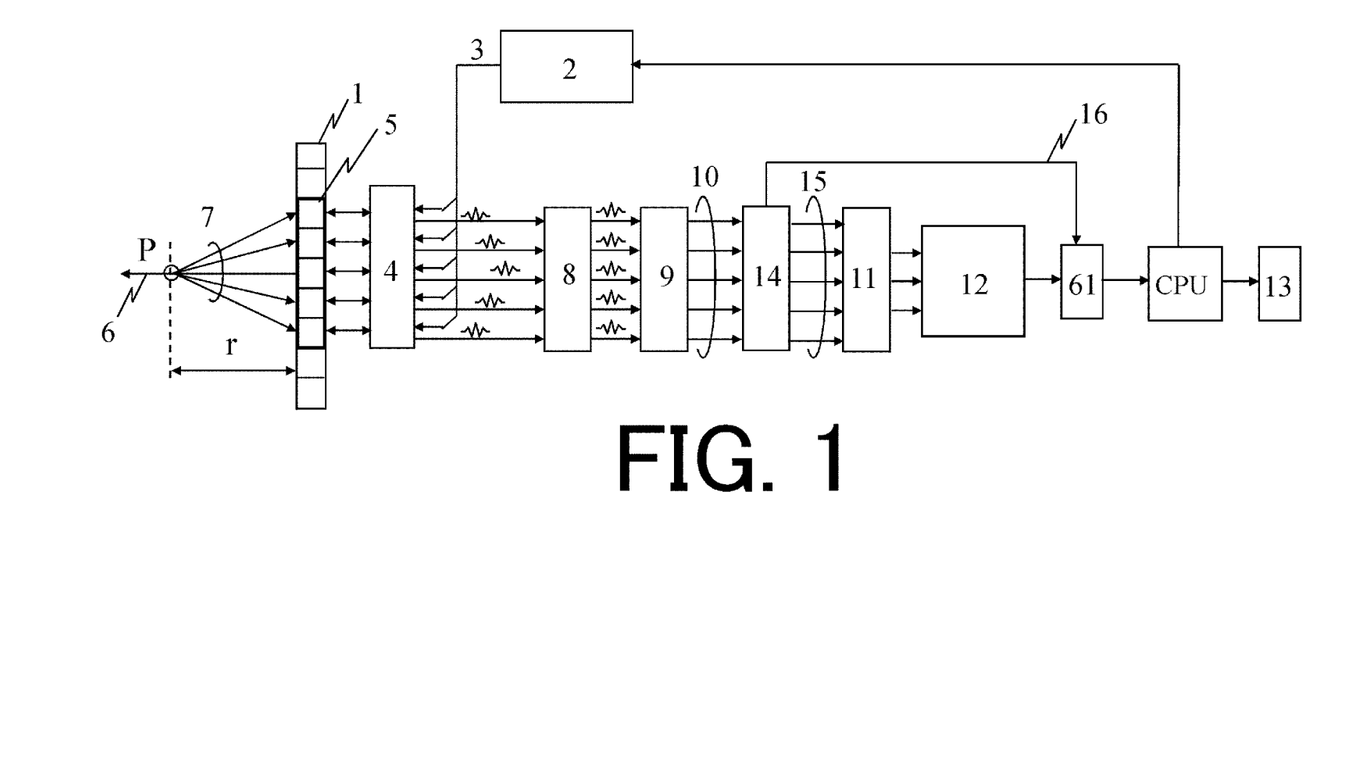
FIG. 1 is a diagram explaining an embodiment of the ultrasound imaging apparatus.

FIG. 1 shows a configuration example of the ultrasound imaging apparatus according to the present invention. In this diagram, a transmitted signal processing circuit 2 generates a transmitted signal 3 based on a command from a CPU, drives an ultrasound transmitting/receiving element group 5 of an ultrasound probe 1 via a switch circuit 4, and transmits a pulsed ultrasound beam 6.

Ultrasound echo waves 7 are generated as a result of the ultrasound beam 6 being reflected within the object. The ultrasound echo waves 7 are converted into n-channel electrical signals by the ultrasound transmitting/receiving element group 5, and sent to a delay circuit 8 through the switch circuit 4. The sent electrical signals are converted into digital signals by an AD conversion circuit not shown. The delay circuit 8 adjusts the delay time of the respective signals so that the arrival time of the echo signals from an arbitrary point P on the ultrasound beam 6 will match.

The complex transformation circuit 9 converts the respective n-channel signals with a matched arrival time into complex signals. The complex transformation processing in the complex transformation circuit 9 is the processing of generating signals in which the phase of the respective frequency components is shifted 90 degrees based on input signals configured from a real valued sequence, and converts the signals with the 90-degree phase shift into complex signals 10 by adding such signals as an imaginary part. The 90-degree phase-shifted signals can be easily generated by using an odd tap or an odd-symmetric coefficient FIR filter.

The level conversion circuit 14 (eliminator) performs the level conversion processing of complex signals for each complex signal group that is required for calculating one complex covariance matrix in the latter complex covariance matrix computational circuit 11. In other words, the level conversion circuit 14 determines the optimal bit shift amount m0 for each complex signal group that is required for calculating one complex covariance matrix to the extent that the maximum value thereof will not overflow. In addition, the level conversion circuit 14 bit-shifts the respective complex signals in a higher direction based on the determined optimal bit shift amount m0.

Furthermore, the level conversion circuit 14 deletes the lower m1 bits of the bit-shifted complex signals, outputs the deleted complex signal group 15, and outputs the optimal bit shift amount m0 as the index data 16 to the latter stage. Note that the number of deleted bits m1 is the predetermined fixed value that is common to all matrices.

The complex covariance matrix computational circuit 11 calculates the complex covariance matrix A[k] by using the n-channel complex signals between the T clocks according to Formula (1). In other words, the complex covariance matrix computational circuit 11 periodically calculates the complex covariance matrix.

Note that the n-channel complex signal between the T clocks are represented as follows.

$$X[kT], X[kT+1], X[kT+2], \ldots, X[kT+T-1]$$

The foregoing "complex signal group that is required for calculating one complex covariance matrix" in the level conversion circuit corresponds to the foregoing T-clock worth of n-channel complex signals.

Since small numerical values are converted into large numerical values based on the level adjustment circuit, the calculation accuracy will not deteriorate even if the lower bits are deleted. Since the complex covariance matrix computational circuit needs to drive multiple product-sum circuits of a complex number to achieve high-speed calculation, the reduction effect of the circuit size based on the elimination of the calculation bit is extremely large.

The constrained minimization of power computational circuit 12 continuously converts the complex covariance matrix A[k]; (k=0, 1, 2, . . . ), input from the complex covariance matrix computational circuit 11 into a gray value q of each target position according to Formula (4) and Formula (5). Here, if the lower m1 bits of the complex signals have been deleted by the level conversion circuit 14, the lower 2*m1 bits will be eliminated in the results of the complex covariance matrix calculation. The constrained minimization of power computational circuit 12 is a circuit with an extremely large calculation amount, including inverse matrix calculation, which is easily imaginable from Formula (4). Thus, if 2*m1 bits are eliminated from the number of bits of the input data, the reduction effect of the circuit size of the constrained minimization of power computational circuit 12 is also extremely large.

The power value calculated by the constrained minimization of power computational circuit 12 is proportional to the size of the complex covariance matrix to become the input. Accordingly, the complex signals shifted higher to m0 bits by the level conversion circuit have a power value of the square of 2*m0 of 2, and the value of the gray value q will be a value in which 2*m0*Log [2] is added to the true value as a result of the LOG conversion of Formula (5).

The correction circuit 61 (corrector) is a circuit which uses the index m0 that is transferred as the index data 16 and subtracts 2*m0*Log [2] from the output value of the constrained minimization of power computational circuit 12. Consequently, the correction circuit 61 can transfer the correct gray value q to the CPU regardless of the shift amount of the level conversion circuit 14. Note that, since the lower m1 bits have been deleted by the level conversion circuit 14, to be exact the bit-deleted portions need to also be corrected by adding 2*m1*Log [2], but such correction is not required depending on the purpose since it is a common offset to all output gray values q.

The CPU uses the transmitted signal processing circuit 2 to collect echo image signals q (gray value) of each target position on the respective ultrasound beam paths while causing it to appropriate scan the transmitting position and direction of the ultrasound beam to obtain the distribution (corresponds to the power distribution) of the gray value, and creates echo image data based thereon. Subsequently, the CPU displays the image data on the display device 13. According to the foregoing configuration, it is possible to realize an ultrasound imaging apparatus based on the CMP method in which the circuit size has been considerably reduced by the present invention.

Figure 2A:
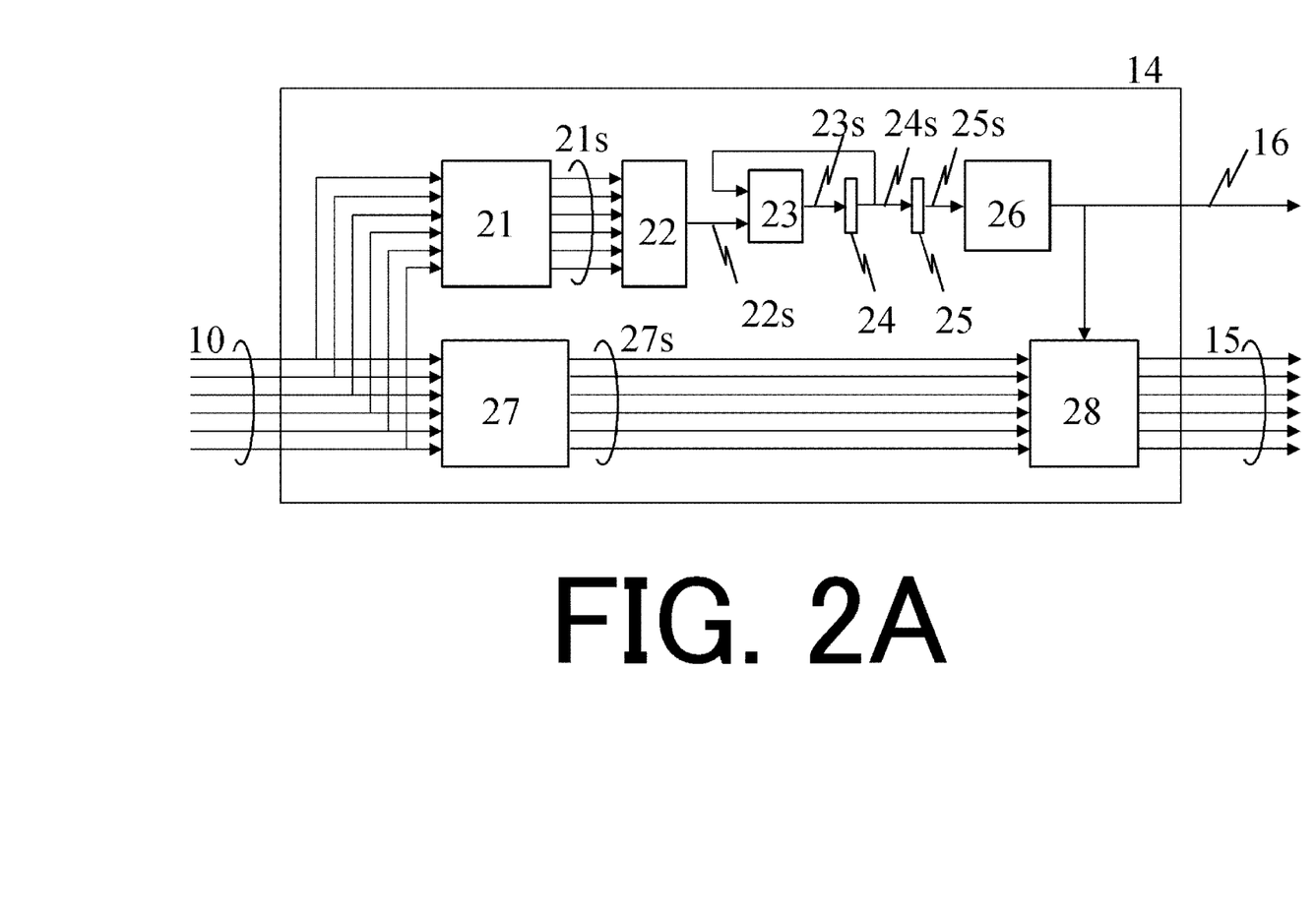
FIG. 2A is a diagram explaining the detailed configuration of the level conversion circuit.

FIG. 2A shows the detailed embodiment of the level conversion circuit 14. In this diagram, the n-channel complex signals 10 that are input from the complex transformation circuit 9 are respectively separated into real parts and imaginary parts and input to the positive value circuit 21 in parallel. The positive value circuit 21 respectively determines the sign of the plurality of input signals, and, if there is a negative numerical value, inverts such numerical value for each bit so that all numerical values become positive value signals 21s.

The OR circuit 22 performs OR processing for each bit of the plurality of positive value signals 21s that were converted. The cumulative OR circuit 23 and the cumulative register 24 perform cumulative OR processing on the output 22s of the OR circuit 22 and outputs the result to the register 25 during a predetermined period T clock related to the calculation of one complex covariance matrix. In other words, the cumulative OR circuit 23 uses the OR signal 22s as the output 23s as is and sets it in the cumulative register 24 with the top clock of the T clock. Meanwhile, with the continuing clocks, the cumulative OR circuit 23 performs OR processing for each bit of the output 24s of the cumulative register 24 and the output signal 22s of the OR circuit 22 and uses this as the output 23s of the cumulative OR circuit 23, and sets it in the cumulative register 24. If this processing is repeated up to the end of the T clock, results of the OR processing per bit of all positive value signals 21s related to one complex covariance matrix calculation will be retained in the register 24. Accordingly, if the results 24s of the cumulative register 24 are set in the register 25 at the top of the subsequent T clock, the positive value conversion and OR processing of all input signals related on one complex covariance matrix calculation will be complete per the T clock, and the results are set in the register 25.

The shift amount computational circuit 26 refers to the signal 25s of the register 25, which is the result of the cumulative OR, and calculates "number of 0 bits continuing into the upper bits−1" as the optimal bit shift amount m0.

The delay circuit 27 is a circuit for delaying the complex signals to be input while the optimal bit shift amount is being calculated, and the bit shift circuit 28 shifts the delayed input signals 27s higher to the number of the optimal shift bit number m0, and deletes and outputs the lower m1 bits.

Figure 2B:
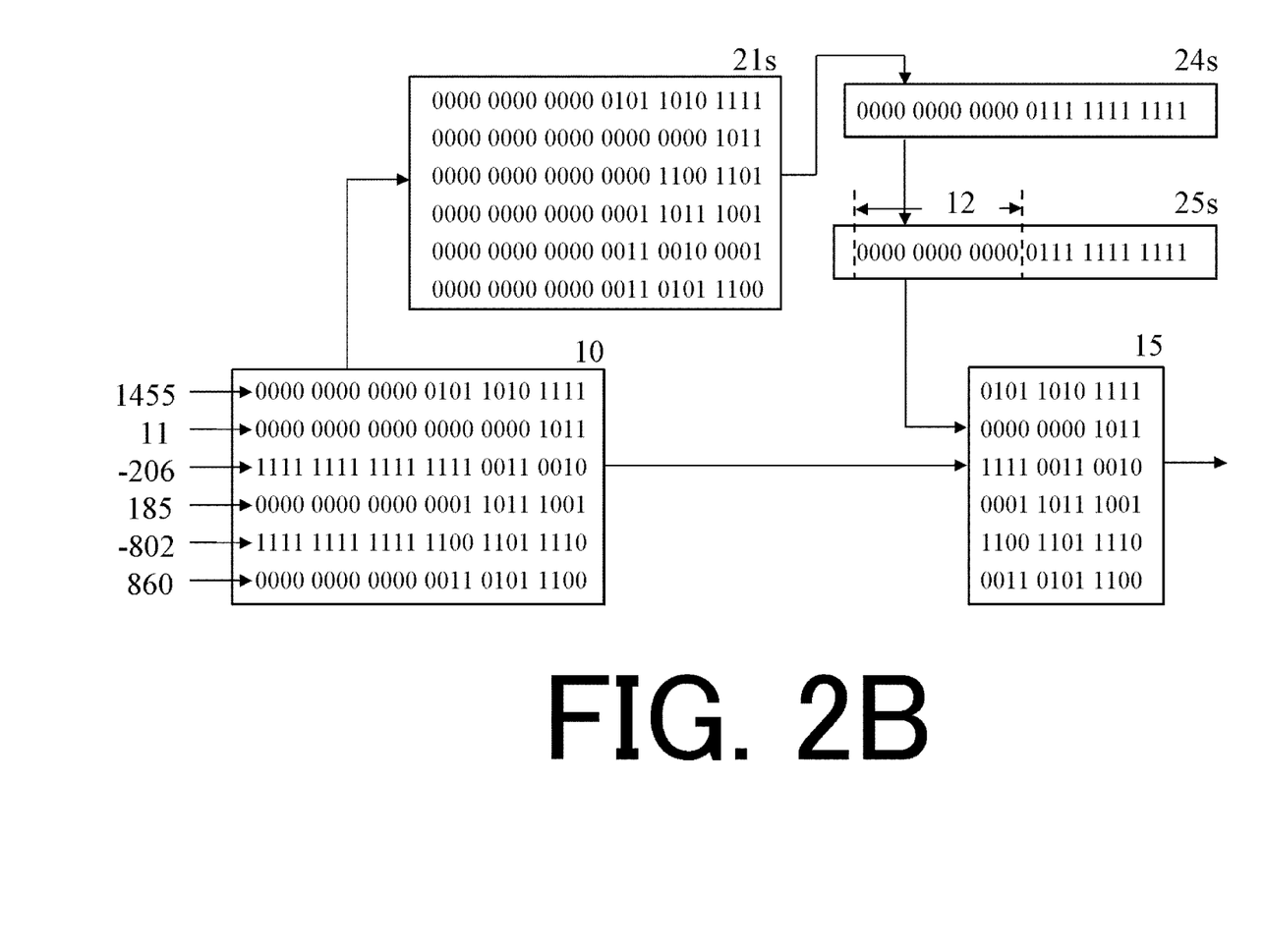
FIG. 2B is a diagram explaining an example of the numerical value calculation of the level conversion circuit.

FIG. 2B is a specific example calculation in a case where six numerical values (1455, 11, −206, 185, −802, 860) are input as the real parts and the imaginary parts of the complex signals 10. The block 10 is a representation of the input numerical values as a binary number, and, when the numerical values of the block 10 are converted into a positive value by the positive value circuit 21, the result will be as shown with the block 21s. When the numerical values that were converted into a positive value are further subject to OR processing by the OR circuit 22 and set in the cumulative register 24, the results of the block 24s are obtained.

If the period T of calculating the complex covariance matrix is greater than 1, the numerical value of the block 24s is subject to OR processing continuously with the subsequent OR signal 22s, and the numerical value of the block 24s is updated. The results of the cumulative OR are set in the register 25 for each matrix calculation period T, and become the block 25s. The shift amount computational circuit 27 refers to the signal of the block 25s, and counts the number of bits of consecutive upper 0 as the optimal shift amount. In this example, the optimal shift amount is 12.

The bit shift circuit 28 shifts the delayed input signals 27s higher by 12 bits, further deletes the lower 12 bits, and outputs the result as the complex signals 15. Consequently, the 24-bit input signal can be reduced to 12 bits, and the computational circuit size of the subsequent complex covariance matrix computational circuit 11 and the constrained minimization of power computational circuit 12 can be considerably reduced.

Figure 3:
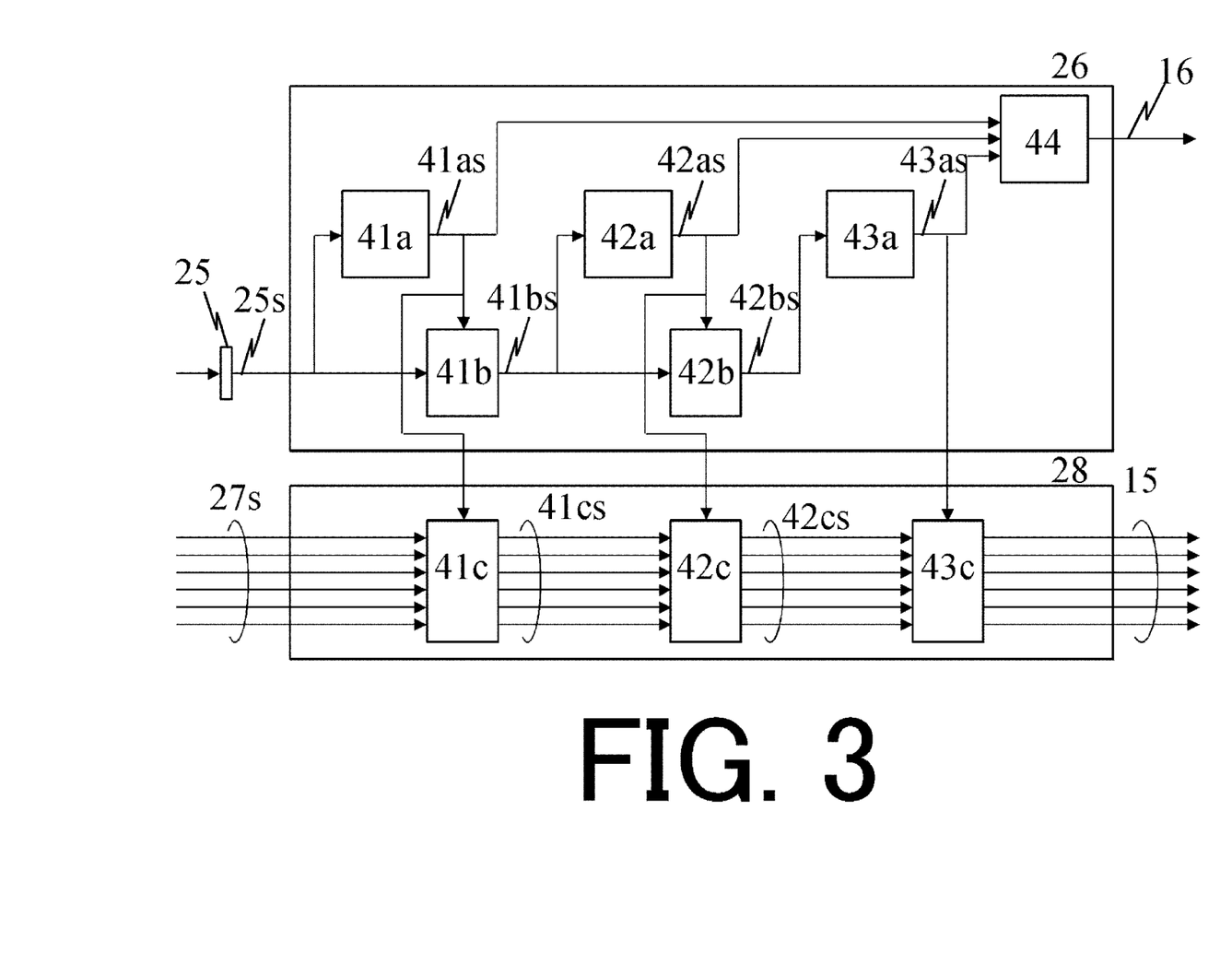
FIG. 3 is a diagram explaining the configuration of the shift amount computational circuit and the bit shift circuit.

FIG. 3 is another embodiment of the shift amount computational circuit 26 and the bit shift circuit 28. In this embodiment, the bit shift processing of up to 7 bits is realized by a multi-stage configuration of the shift processing of 4 bits, 2 bits, and 1 bit.

The 4-bit shift determination circuit 41a determines the value of the upper 5 bits of the register 25, and generates a 4-bit shift signal 41as if all bits are 0. The 4-bit shift circuits 41b, 41c perform 4-bit shifting to the respective signals 25s, 27s when the 4-bit shift signal 41as is ON, and outputs these as the signal 41bs, 41cs, without any shifting, to the subsequent stage when the 4-bit shift signal 41as is OFF.

The 2-bit shift determination circuit 42a determines the value of the upper 3 bits of the signal 41bs from the former stage, and generates a 2-bit shift signal 42as if all bits are 0. The 2-bit shift circuits 42b, 42c perform 2-bit shifting to the respective input signals 41bs, 41cs when the 2-bit shift signal 42as is ON, and outputs these as the signal 42bs, 42cs, without any shifting, to the subsequent stage when the 2-bit shift signal 42as is OFF.

The 1-bit shift determination circuit 43a determines the value of the upper 2 bits of the signal 42bs from the former stage, and generates a 1-bit shift signal 43as if all bits are 0. The 1-bit shift circuit 43c performs 1-bit shifting to the input signal 42cs when the 1-bit shift signal 43as is ON, and outputs this as the signal 43cs, without any shifting, to the subsequent stage when the 1-bit shift signal 43as is OFF.

The index computational circuit 44 determines the ON/OFF of the shift signals 41as, 42as, 43as, and respectively adds 4, 2, 1 when the shift signals 41as, 42as, 43as are ON and uses the result as the total shift amount. The total shift amount is output as index data to the latter circuit.

Based on the foregoing configuration, it is possible to omit the slightly troublesome processing of having to count the number of consecutive 0 bits of the upper bits of the register 25, and execute the bit shift processing of up to 7 bits. If the number of stages of the shift processing is increased, even greater bit shift processing can be realized. Moreover, depending on the design specification, it is possible to omit the latter shift circuit for the small number of bits, and reduce the overall size of the circuit.

Figure 4:
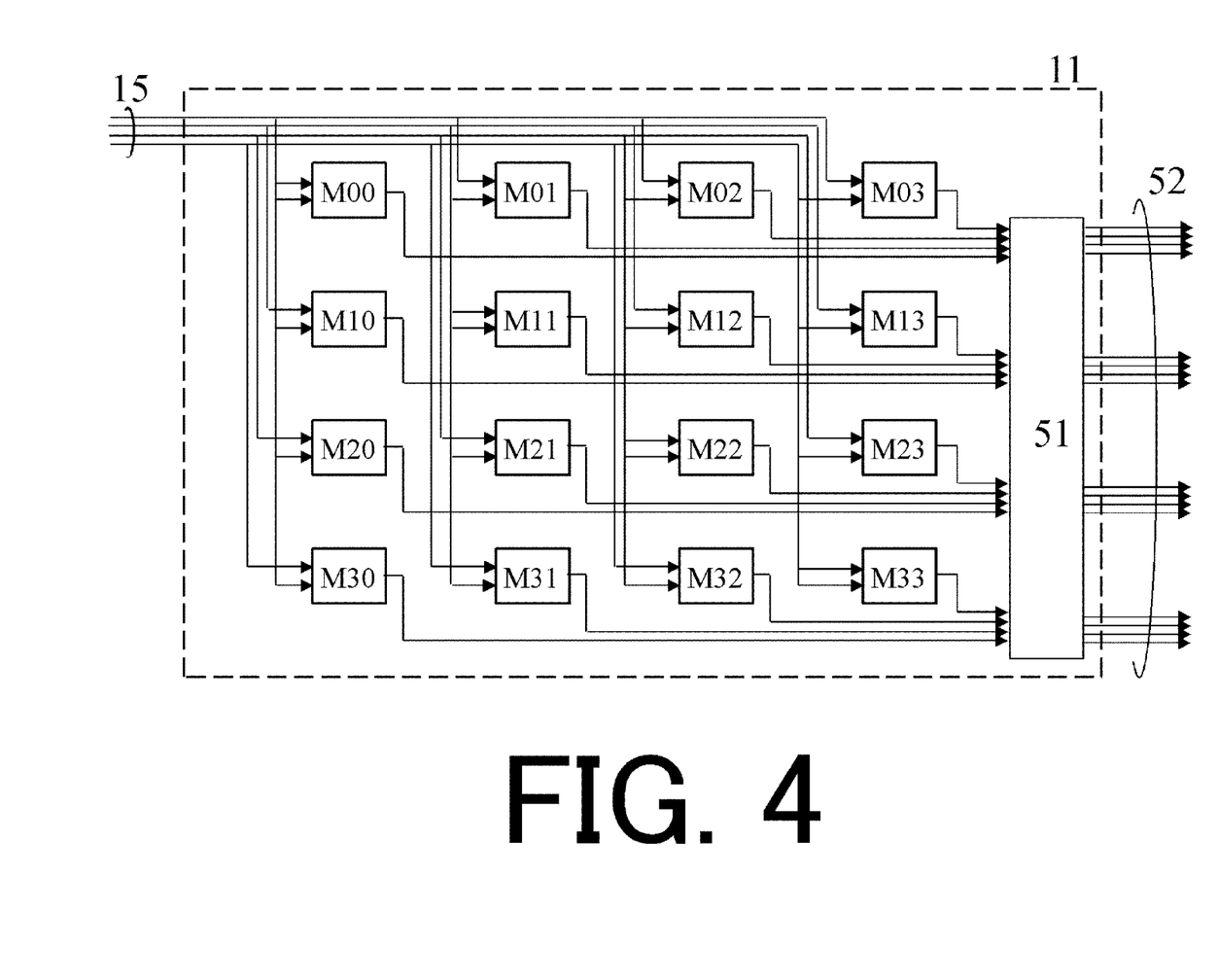
FIG. 4 is a diagram explaining the detailed configuration of the complex covariance matrix computational circuit.

FIG. 4 shows the detailed configuration of the complex covariance matrix computational circuit 11 when the 4-channel complex signal 15 is input. The complex covariance matrix computational circuit 11 calculates the multiplication among the respective elements of the complex signal vector based on 16 complex multiplying circuits M00, M01, . . . , M33, cumulatively adds the results with the cumulative addition circuit 51 during the matrix calculation period T clock, and outputs the 16 matrix elements 52.

Accordingly, the complex covariance matrix computational circuit 11 requires numerous complex multiplying circuits and cumulative addition circuits which are proportional to the square of the number of input channels, and the reduction effect of the circuit size will be extremely large if it is possible to eliminate the number of bits of the input signals without deteriorating the calculation accuracy.

Figure 5:
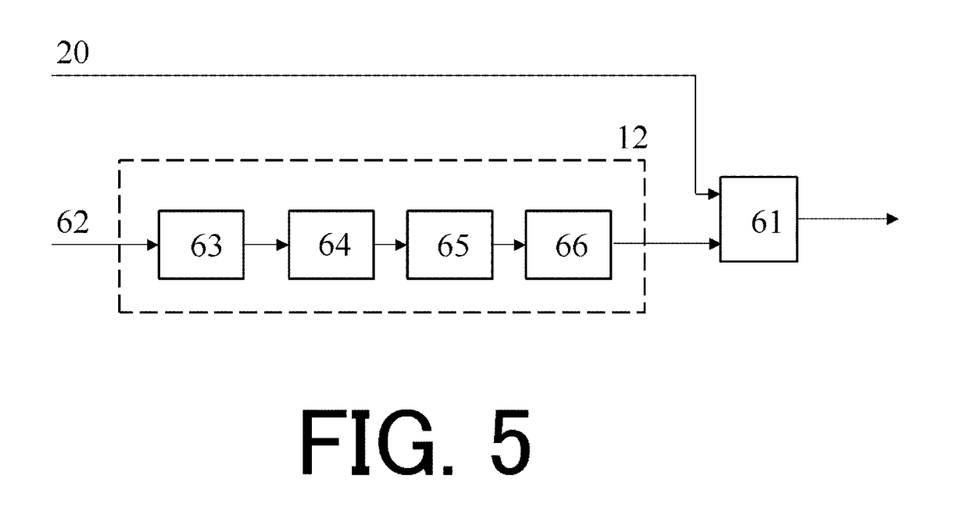
FIG. 5 is a diagram explaining the detailed configuration of the constrained minimization of power computational circuit.

FIG. 5 shows the detailed embodiment of the constrained minimization of power computational circuit 12 which calculates Formula (4) and Formula (5). The constrained minimization of power computational circuit 12 contains the QR decomposition circuit 63, the backward substitution computational circuit 64, and the power computational circuit 65 as circuits for calculating Formula (4) by using the complex covariance matrix A and the constant constrained vector C which are input as the signal 62. The constrained minimization of power computational circuit 12 is also configured from the LOG conversion circuit 66 for calculating Formula (5).

The term of the denominator of Formula (4) is represented in Formula (6) below.
[Math. 6]

$$C^H A^{-1} C \qquad (6)$$

Normally, this formula is calculated as the inner product of solution vectors Y and C of a simultaneous linear equation as shown in Formula (7) below.
[Math. 7]

$$AY = C \qquad (7)$$

The QR decomposition calculation and the backward substitution calculation (Back Substitution) are calculation processing for obtaining the solution vector Y of the simultaneous linear equation shown in Formula (7).

When Formula (7) is described by being developed into elements, it is represented as shown in Formula (8) below.

[Math. 8]

$$\begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \vdots & \vdots & \vdots & \ddots & \vdots \\ a_{n1} & a_{n2} & a_{n3} & \cdots & a_{nn} \end{bmatrix} \begin{bmatrix} y_1 \\ y_2 \\ y_3 \\ \vdots \\ y_n \end{bmatrix} = \begin{bmatrix} c_1 \\ c_2 \\ c_3 \\ \vdots \\ c_n \end{bmatrix} \quad (8)$$

The QR decomposition circuit 63 is a processing circuit that multiplies a rotation matrix to both members of Formula (8) and modifies Formula (8) into simultaneous linear equations in which the coefficient matrix is converted into an upper triangle; that is, into Formula (9) below.

[Math. 9]

$$\begin{bmatrix} r_{11} & r_{12} & r_{13} & \cdots & r_{1n} \\ 0 & r_{22} & r_{23} & \cdots & r_{2n} \\ 0 & 0 & r_{33} & \cdots & r_{3n} \\ \vdots & \vdots & \vdots & \ddots & \vdots \\ 0 & 0 & 0 & \cdots & r_{nn} \end{bmatrix} \begin{bmatrix} y_1 \\ y_2 \\ y_3 \\ \vdots \\ y_n \end{bmatrix} = \begin{bmatrix} b_1 \\ b_2 \\ b_3 \\ \vdots \\ b_n \end{bmatrix} \quad (9)$$

As the specific calculation procedures, known are algorithms such as the Givens Rotation and Householder Conversion.

The backward substitution computational circuit 64 is a computational circuit which obtains the solution vector Y by calculating Formula (9) based on the procedures shown in Formula (10) below.

[Math. 10]

$$y_n = \frac{1}{r_{nn}} \cdot b_n \quad (10)$$
$$y_{n-1} = \frac{1}{r_{n-1n-1}} \cdot (b_{n-1} - r_{n-1n} \cdot y_n)$$
$$y_{n-2} = \frac{1}{r_{n-2n-2}} \cdot (b_{n-2} - r_{n-2n} \cdot y_n - r_{n-2n-1} \cdot y_{n-1})$$
$$y_{n-3} = \frac{1}{r_{n-3n-3}} \cdot (b_{n-3} - r_{n-3n} \cdot y_n - r_{n-3n-1} \cdot y_{n-1} - r_{n-3n-2} \cdot y_{n-2})$$
$$\vdots$$

The power computational circuit 65 is a circuit which calculates the constrained minimization of power Pow as shown in Formula (11) below by using the obtained solution vector Y and the known constrained vector C.

[Math. 11]

$$Pow = \frac{1}{2 \cdot C^H Y} \quad (11)$$

Accordingly, calculation of the constrained minimization of power can be realized by converting known calculation algorithms into circuits. Nevertheless, since the QR decomposition calculation required complex multiplications proportional to roughly the cube of the size of the complex covariance matrix, if the speed-up of the calculation processing is attempted with the parallelization of circuits, there was no choice for the computational circuit to become a large scale. If the signal bit number of the matrix elements to become the input can be eliminated by the level conversion circuit, such elimination effect cannot be overestimated in terms of practical application.

The LOG conversion circuit 66 is a circuit which performs the LOG conversion calculation of Formula (5). Moreover, the correction circuit 61 is a circuit which corrects the results of the level conversion processing by using the index m0 that is input as the index data 20. The correction circuit 61 subtracts the value of Formula (12) below from the output of the LOG conversion circuit 66, and outputs the result to the latter CPU.

[Math. 12]

$$2m0 \cdot \text{Log}\,[2] \quad (12)$$

According to the foregoing configuration, it is possible to easily realize the ultrasound imaging apparatus based on the CMP method to which the present invention is applied.

The complex covariance matrix computational circuit and the constrained minimization of power computational circuit which are unique to the CMP method contain numerous complex multiplication processing as described above. In order to process such numerous complex multiplications at a high speed, the complex covariance matrix computational circuit and the constrained minimization of power computational circuit need to drive numerous multiplying circuits in parallel, and there was no choice for the circuit to become a large scale. Since the circuit size of the multiplying circuit is normally proportional to the square of the signal bit number, the circuit size reduction effect based on the reduction of the signal bit number is extremely large. For example, if the signal bit number becomes ½, the overall circuit size will be ⅓ to ¼, and the effect of the present invention of reducing the circuit size is extremely large in terms of practical application. Moreover, if the signal bit number can be reduced, the drive cock frequency of the computational circuit can be increased accordingly, and higher calculation speed can be realized.

<Embodiment 2>

Figure 6:
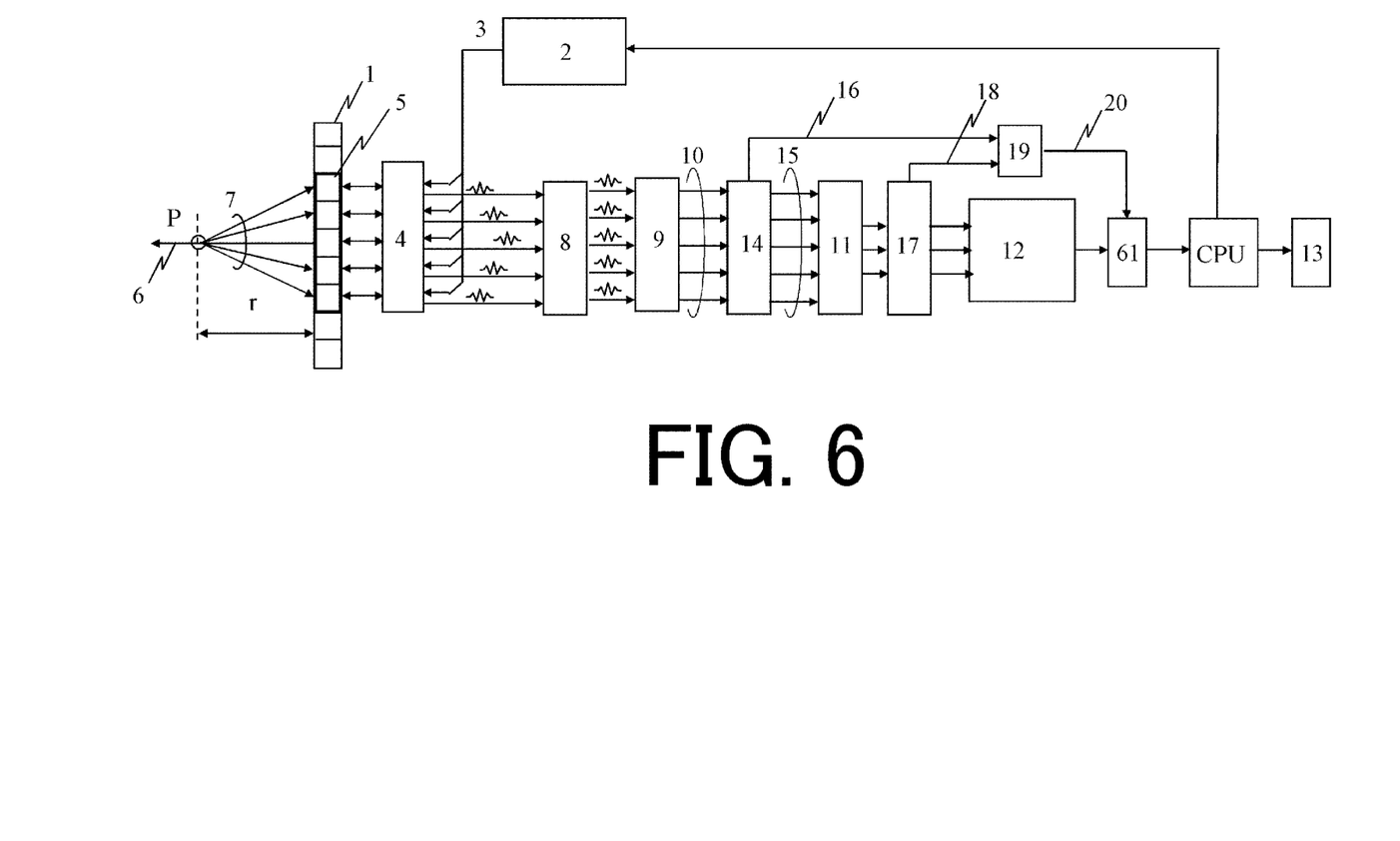
FIG. 6 is a diagram explaining another embodiment of the ultrasound imaging apparatus.

FIG. 6 is another embodiment in which a level conversion circuit 17 is added to the former stage of the constrained minimization of power computational circuit 12 relative to Embodiment 1. The level conversion circuit 17 performs, in covariance matrix units, level conversion to the matrix elements calculated with the complex covariance matrix computational circuit 11, and outputs the matrix elements from which the number of bits was reduced to the constrained minimization of power computational circuit 12.

The detailed configuration of the level conversion circuit 17 is basically the same as the configuration of the level conversion circuit 14 shown in FIG. 2. With the level conversion circuit 17, the real parts and the imaginary parts of the matrix elements are input in parallel as the signals 10. The matrix elements to be input are respectively converted into a positive value, subject to cumulative OR, and then set in the register 25 for each matrix element configuring one covariance matrix. The shift amount computational circuit 26 calculates the optimal shift amount based on the register 25, and the bit shift circuit 28 shifts the individual matrix elements, which are the outputs of the delay circuit 27, higher in the amount of the optimal shift amount. The bit shift circuit 28 additionally deletes the lower constant bits, and outputs the result as the bit-eliminated matrix element data to the latter constrained minimization of power computational circuit 12.

The number of bits of the respective matrix elements of the complex covariance matrix have been eliminated by the level conversion circuit 14, but the magnitude relation of the calculated matrix elements may change due to the calculation of the complex covariance matrix. Thus, if the bit number elimination of the matrix elements is performed by adding the level conversion circuit 17 before the constrained minimization of power computational circuit 12 as in Embodiment 2, the circuit size of the constrained minimization of power computational circuit 12 can be further reduced.

In the foregoing case, the index data to be transferred to the correction circuit 61 will be the result of synthesizing the index data 16 and the index data 18 output from the two level conversion circuits as shown in the diagram. Specifically, since the index 16 that is output from the level conversion circuit 14 counted as double by the complex covariance matrix calculation, the double of the index 16 and the index 18 of the level conversion circuit 17 are added by the index synthesizing circuit 19, and the results are transferred as the index data 20 to the correction circuit 61.

According to the foregoing configuration, it is possible to realize an ultrasound imaging apparatus with an even more reduced circuit size in comparison to Embodiment 1. Moreover, although two level conversion circuits 14, 17 are mounted in Embodiment 2, it is evident that effects can still be yielded even when the level conversion circuit 14 is omitted and only the level conversion circuit 17 is used.

Note that each of the foregoing embodiments explained an apparatus for processing echo signals induced inside the object based on the irradiation of ultrasound beams. Nevertheless, the present invention is similarly effective even when the object is irradiated with electromagnetic waves (typically light) and the ultrasound signals (photoacoustic waves) induced in and emitted from within the object are processed. Thus, the apparatus of the present invention may also comprise a irradiation means from which electromagnetic waves are irradiated. As the irradiation means, for instance, a light source from which laser beams are irradiated may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105319, filed on May 10, 2011, which is hereby incorporated by reference herein in its entirety.

The invention claimed is:

1. An object information acquiring apparatus, comprising:
a delay unit which matches phases of received signals output from a plurality of receiving elements that has received acoustic waves emitted from an object;
a complex converter which converts the received signals output from said delay unit into complex signals;
a complex covariance matrix calculator which periodically obtains a complex covariance matrix by using a complex signal group configured from a plurality of phase-matched complex signals;
an eliminator which uses, as input data, at least either the complex signal group or matrix elements contained in the complex covariance matrix, and reduces a number of bits of the input data; and
an electric power calculator which calculates a power value of each target position based on the complex covariance matrix,
wherein said eliminator reduces the number of bits by performing common level conversion processing on a plurality of input data relating to one complex covariance matrix.

2. The object information acquiring apparatus according to claim 1, wherein said eliminator performs a bit shift on signals contained in the input data in a higher direction by a number of bits that is common to the signals for each input data related to the one complex covariance matrix to an extent that a maximum value of the input data does not overflow, and deletes lower bits in the plurality of input data by a number of bits that is common to the all input data.

3. The object information acquiring apparatus according to claim 2, further comprising:
a corrector which corrects the power value calculated by said electric power calculator according to the number of bits shifted by said eliminator.

4. The object information acquiring apparatus according to claim 2, wherein said eliminator determines the number of bits to be shifted based on the results of performing OR processing per bit on the signals contained in the input data converted into a positive value and represented as a binary number.

5. The object information acquiring apparatus according to claim 1, wherein the acoustic waves emitted from the object result from the acoustic waves transmitted from the receiving elements being reflected inside the object.

6. The object information acquiring apparatus according to claim 1, further comprising:
a light source which irradiates the object with electromagnetic waves,
wherein the acoustic waves emitted from the object are photoacoustic waves emitted from the object irradiated with the electromagnetic waves by said light source.

7. The object information acquiring apparatus according to claim 1, wherein said electric power calculator calculates the power value using an adaptive signal processing method.

8. The object information acquiring apparatus according to claim 7, wherein the adaptive signal processing method includes Constrained Minimization of Power method.

9. The object information acquiring apparatus according to claim 1, wherein said electric power calculator includes a QR-decomposition circuit.

10. The object information acquiring apparatus according to claim 1, further comprising the plurality of receiving elements.

11. An object information acquiring method, comprising the steps of:
matching, using a processor, phases of received signals output from a plurality of receiving elements that has received acoustic waves emitted from an object;
converting, using the processor, the received signals processed by the matching step into complex signals;
obtaining, using the processor, a complex covariance matrix periodically by using a complex signal group configured from a plurality of phase-matched complex signals;
reducing, using the processor, a number of bits of the input data using at least either the complex signal group or matrix elements contained in the complex covariance matrix as input data, and
calculating, using the processor, a power value of each target position based on the complex covariance matrix,
wherein the number of bits are reduced by performing common level conversion processing on a plurality of input data relating to one complex covariance matrix.

12. The object information acquiring method according to claim 11, wherein said reducing step includes performing a bit shift on signals contained in the input data in a higher direction by a number of bits that is common to the signals for each input data related to the one complex covariance matrix to an extent that a maximum value of the input data does not overflow, and deleting lower bits in the plurality of input data by a number of bits that is common to the all input data.

13. The object information acquiring method according to claim 12, further comprising:
correcting, using the processor, the power value calculated in said calculating step according to the number of bits shifted in said reducing step.

14. The object information acquiring method according to claim 12, wherein said reducing step includes determining the number of bits to be shifted based on the results of performing OR processing per bit on the signals contained in the input data converted into a positive value and represented as a binary number.

15. The object information acquiring method according to claim 11, wherein the acoustic waves emitted from the object result from the acoustic waves transmitted from the receiving elements being reflected inside the object.

16. The object information acquiring method according to claim 11, further comprising:
irradiating, using a light source, the object with electromagnetic waves,
wherein the acoustic waves emitted from the object are photoacoustic waves emitted from the object irradiated with the electromagnetic waves.

17. The object information acquiring method according to claim 11, wherein said calculating step includes calculating the power value using an adaptive signal processing method.

18. The object information acquiring method according to claim 17, wherein the adaptive signal processing method includes Constrained Minimization of Power method.

19. The object information acquiring method according to claim 11, wherein said calculating step is performed using the processor, and wherein the processor includes a QR-decomposition circuit.

* * * * *